United States Patent
Nelson

(10) Patent No.: US 7,075,304 B2
(45) Date of Patent: Jul. 11, 2006

(54) VARIABLE DAMPING INDUCTION COIL FOR METAL DETECTION

(75) Inventor: Carl V. Nelson, Derwood, MD (US)

(73) Assignee: The Johns Hopkins University, Baltimore, MD (US)

( * ) Notice: Subject to any disclaimer, the term of this patent is extended or adjusted under 35 U.S.C. 154(b) by 100 days.

(21) Appl. No.: 10/942,150

(22) Filed: Sep. 16, 2004

(65) Prior Publication Data

US 2006/0006872 A1 Jan. 12, 2006

Related U.S. Application Data

(60) Provisional application No. 60/507,817, filed on Oct. 1, 2003.

(51) Int. Cl.
*G01V 3/08* (2006.01)
*G01V 3/10* (2006.01)

(52) U.S. Cl. ..................... 324/329; 324/326

(58) Field of Classification Search ............ 324/239, 324/334, 337, 228, 323, 326, 329, 234, 243, 324/207.26; 340/568.1, 540, 686.6, 551
See application file for complete search history.

(56) References Cited

U.S. PATENT DOCUMENTS

| 4,638,262 | A  | * | 1/1987  | Miyamoto   | 331/65   |
| 5,512,878 | A  | * | 4/1996  | Balch et al. | 340/572.4 |
| 6,326,790 | B1 | * | 12/2001 | Ott et al. | 324/327  |
| 6,686,742 | B1 |   | 2/2004  | Candy      |          |
| 2002/0180443 | A1 | * | 12/2002 | Fine et al. | 324/338 |

* cited by examiner

*Primary Examiner*—Edward Lefkowitz
*Assistant Examiner*—Kenneth J. Whittington
(74) *Attorney, Agent, or Firm*—Albert J. Fasulo, II

(57) ABSTRACT

A pulse inductive metal detector that includes a variable resistor for controlling coil characteristics for both transmitter and receiver modes of operation. A coil coupled with an electronic switch is charged with current from the power source in a transmitter mode such that when the electronic switch is abruptly switched closed the coil emits a magnetic field that induces eddy currents in a metal target. Once the transmitter magnetic fields have decayed enough, the coil can be operated in a receiver mode to detect a magnetic field resulting from eddy currents in the metal target. The variable resistor is coupled across the coil for varying the resistance across the coil to optimize the pulse inductive metal detector sensitivity to the metal target.

5 Claims, 4 Drawing Sheets

Transmit Side | Receive Side

VARIABLE DAMPING INDUCTION COIL FOR METAL DETECTION

CROSS-REFERENCE TO RELATED APPLICATIONS

This application claims the benefit of U.S. provisional application No. 60/507,817, filed on Oct. 1, 2003, which is incorporated herein by reference in its entirety.

STATEMENT OF GOVERNMENTAL INTEREST

This invention was made with U.S. Government support under Navy contract no. N00024-98-D-8124. The U.S. Government has certain rights in this invention.

BACKGROUND

FIG. 1 is a block diagram of a conventional pulsed EMI metal detector and method of operation. A current loop transmitter 10 is placed in the vicinity of the buried metal target 12, and a steady current flows in the transmitter 10 for a sufficiently long time to allow turn-on transients in the soil (soil eddy currents) to dissipate. The transmitter loop current is then turned off. The transmitter current is typically a pulsed waveform. For example, a square-wave, triangle or saw-tooth pulsed waveform, or a combination of different positive and negative current ramps.

According to Faraday's Law, the collapsing magnetic field induces an electromotive force (EMF) in nearby conductors, such as the metal target 12. This EMF induces eddy currents to flow in the conductor. Because there is no energy to sustain the eddy currents, they begin to decrease with a characteristic decay time that depends on the size, shape, and electrical and magnetic properties of the conductor. The decay currents generate a secondary magnetic field that is detected by a magnetic field receiver 14 located above the ground and coupled to the transmitter 10 via a data acquisition and control system 16.

Pulse induction metal detector (PIMD) antennas (transmitter and receiver coil) come in two basic types as shown in FIGS. 2a and 2b. The first type of PIMD shown in FIG. 2a illustrates a single combined transmitter and receiver coil 23 and damping resistor 22 with multiple loops of wire forming the coil 23. A current pulse is sent through the multiple turn coil 23 and the received metal detection signal is sensed by the same coil 23. The small voltage generated by the metal target is typically amplified by a high gain electronic amplifier 25 (typical gain factor of 100 to 1000). A protection circuit 24 is provided to protect the sensitive amplifier from the high kick-back voltage pulse generated by switching the inductive coil off abruptly ($V=L\, di/dt$, where L is the inductance of the transmitter coil and di/dt is the slope of the current decay in the coil).

The second type of PIMD illustrated in FIG. 2b uses a separate coil 27 and damping resistor 26 for the transmitter and a coil 29 and damping resistor 28 for the receiver. This configuration provides isolation between the transmitter circuit and the receiver circuit and allows for more flexibility in the receiver coil 29 (e.g., different number of turns, size or differential coil configuration) and amplifier circuit design (e.g., single ended operation of electronics). The high gain amplifier 25 also sees the high kick-back voltage pulse generated by switching the transmitter coil 27 off abruptly and protection circuitry 24 is needed to protect it from damage.

The induced eddy currents in a metal target are proportional to the change in magnetic field with time ($\Delta B/\Delta t$) at the metal target location. For high sensitivity, one would like to have dB as large as practical and $\Delta t$ (the change in time) matched to the metal object's time response (bandwidth). For a small metal object with a fast time response (high bandwidth) the optimal detector sensitivity would be achieved with a small $\Delta t$ matched to the small metal objects response (matching bandwidth of sensor and target). For a large metal object with a slower time response the optimal detector sensitivity would be achieved with a larger $\Delta t$ matched to the metal object's time response. The magnetic field (B) is proportional to the current (I) in the transmitter coil and the number of coil turns (N), thus $B \sim IN$. More coil turns (N) increases the magnetic field at the target depth for a fixed current. However, increasing the number of coil turns also increases the kick-back voltage across the transmitter coil and switch due to the increased inductance. The voltage across the transmitter coil and the electronic switch turning off the coil current is $V=L\, di/dt$ and $L \sim N^2$. More coil turns also increases the capacitance C of the coil due to the potential (voltage) differences that exist between the individual turns of wire which makes up the coil.

Consider the transmitter coil. The same effects apply also to a receiver coil that is being excited by a transmitter coil. At the moment of current change in the transmitter coil, a high voltage appears across the coil. A fixed shunt resistor R is typically placed across the transmitter coil to dissipate the current in the coil. The resistor is called the damping resistor since it is used to dampen or suppress coil oscillation caused by the LCR circuit formed by the coil. The larger the shunt resistor, the greater the current dissipation and the faster the current decay. Fast current decay allows for small metal targets to be more easily detected since the coil has a higher bandwidth. If the damping resistor value is set to high current is forced into the coil where the capacitance and inductance combination causes voltage/current oscillations: the oscillations will mask small metal target signals. A small damping resistor slows down the coil decay and lower the sensitivity of the coil to small metal targets. Controlling the damping resistor effects the performance of the PIMD.

SUMMARY

The present invention is a pulse inductive metal detector. It includes an electronic switch for switching a power source on and off. A coil coupled with the electronic switch is charged with current when the switch is closed from the power source in a transmitter mode such that when the electronic switch is abruptly switched open the coil emits a magnetic field that induces eddy currents in a metal target. Once the transmitter magnetic fields have decayed enough, the switch can be closed and the coil can be operated in a receiver mode to detect a magnetic field resulting from eddy currents in the metal target. A variable resistor is coupled across the coil for varying the resistance across the coil to optimize the pulse inductive metal detector sensitivity to the metal target.

The variable resistor can be made from a MOSFET transistor coupled with a digital-to-analog converter. A computer controls the digital-to-analog converter such that it sends a control signal to the digital-to-analog converter causing the gate voltage of the MOSFET to vary. This, in turn, affects the resistance between the source and drain of the MOSFET. The electronically controlled variable resistor can operate in either a static mode with fixed resistance values set at different times during the metal detection process or dynamically such that the resistance of the variable resistor is optimized as a function of time during the metal detection process.

The present invention can be implemented for a pulse inductive metal detector that utilizes a combined transmitter/receiver coil or separate coils for the transmitter and receiver. If using separate coils, then each of the coils can be outfitted with a variable resistor to control the characteristics of its respective coil. The computer can be used to control both variable resistors in a two coil implementation.

DETAILED DESCRIPTION

The present invention applies to pulse inductive metal detectors (PIMDs). The present invention replaces the fixed damping resistor that is placed across the transmitter and/or receiver coil in a typical PIMD with a variable resistor. The variable resistor is computer controlled so as to be configurable for different metal detection conditions. The electronically controlled variable resistor can operate in either a static mode with fixed resistance values set at different times during the metal detection process or dynamically such that the resistance of the variable resistor is optimized as a function of time during the metal detection process. Thus, the metal detector operator can control parameters like the bandwidth and kick-back voltage of the transmitter or receiver coil to optimize the PIMD in a wide range of environmental and operating conditions.

Figure 1:
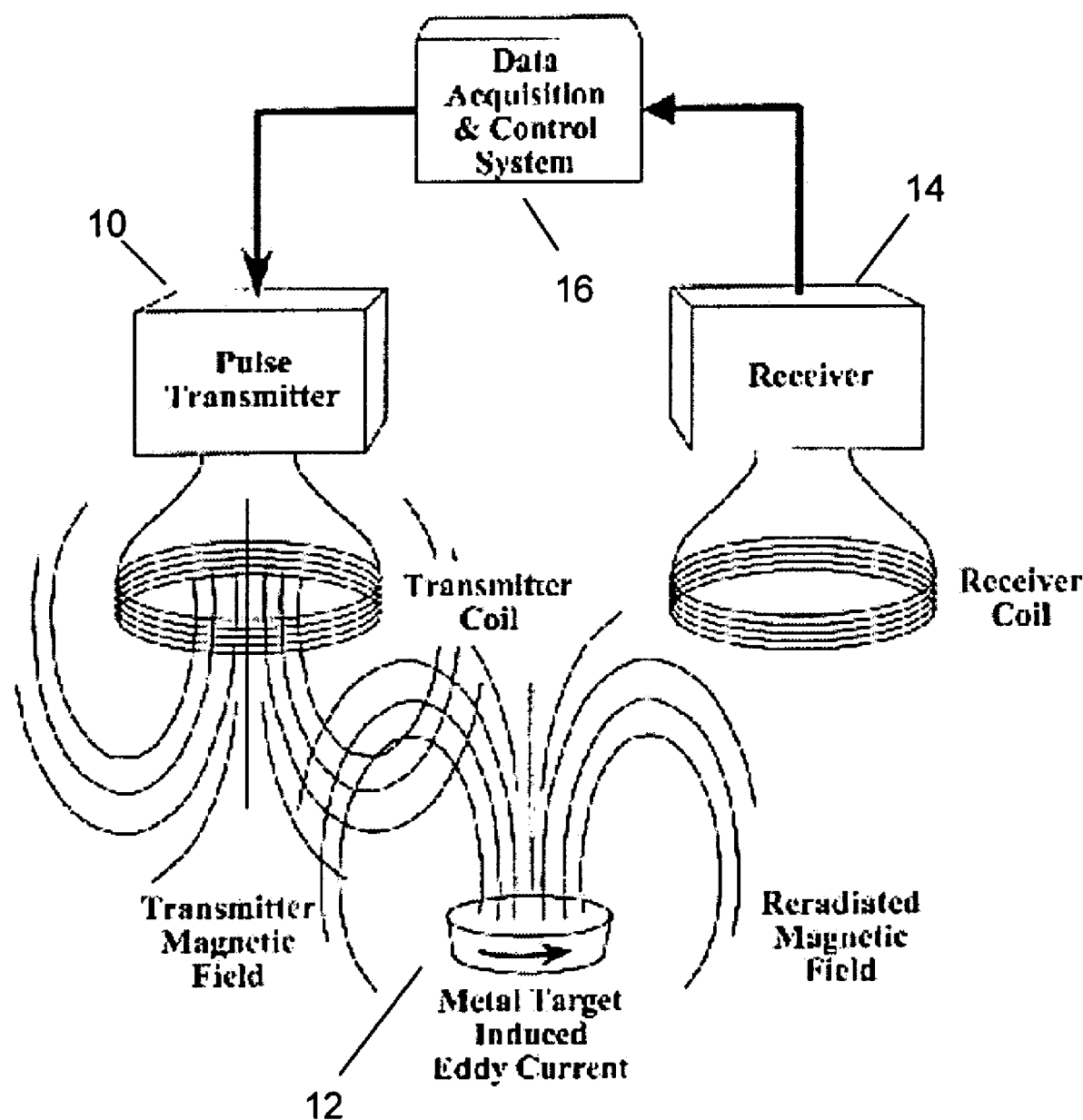
FIG. 1 illustrates a block diagram of a conventional pulsed EMI metal detector and method of operation.
Figure 2A:
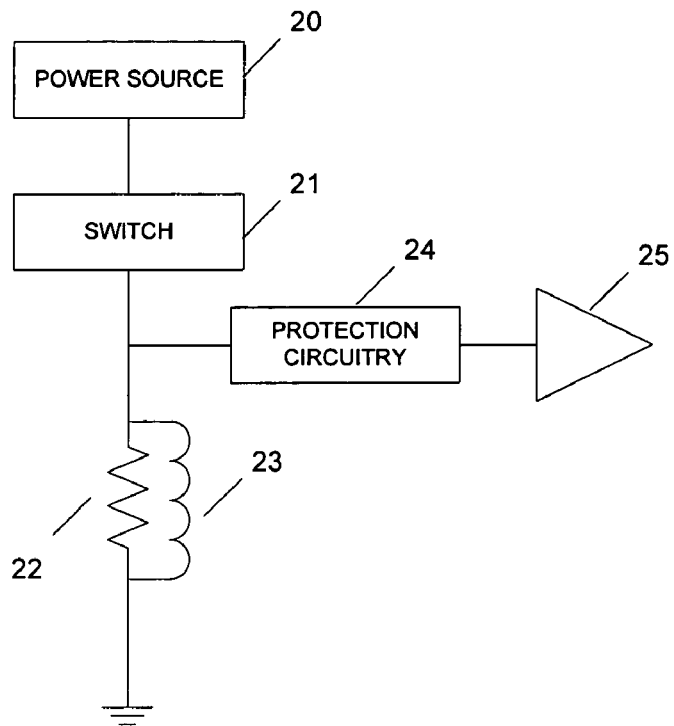
FIG. 2a illustrates a PIMD having a single transmit and receiver coil with multiple loops of wire forming the coil.

FIGS. 2a and b illustrate typical PIMD single and dual coil configurations respectively. Referring to FIG. 2a, in normal operations, a single power source 20 excites the transmitter coil 23 with a current and a single electronic switch abruptly cuts off the current supply to the transmitter coil inducing eddy currents in nearby metal targets. A damping resistor 22 is placed across the combined transmitter/receiver coil 23 to suppress coil oscillations and to control the di/dt of the transmitter/receiver current in the coil 23, i.e., the coil time constant ($\tau \sim L/R$) where L is the coil inductance and R is the damping resistor value. The coil damping resistor also controls the kick-back voltage ($V \sim L\, di/dt$) when the switch 21 is rapidly opened. In addition, the damping resistor controls the bandwidth of the coil when in receiver mode.

Figure 2B:
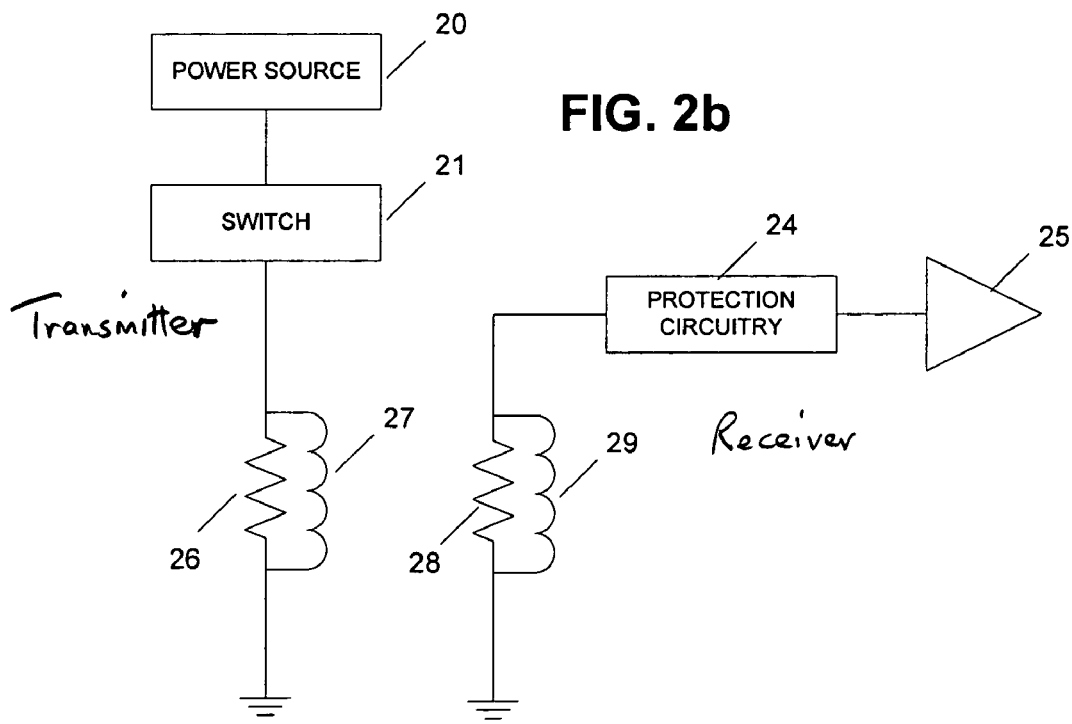
FIG. 2b illustrates a PIMD having a separate transmit and receiver coils with multiple loops of wire forming each coil.

The above applies to the dual coil configuration of FIG. 2b. This time separate damping resistors 26, 28 are used across the transmitter coil 27 and receiver coil 29, respectively. Damping resistor 26 controls the kick-back voltage while damping resistor 28 controls the receiver coil bandwidth.

Figure 3A:
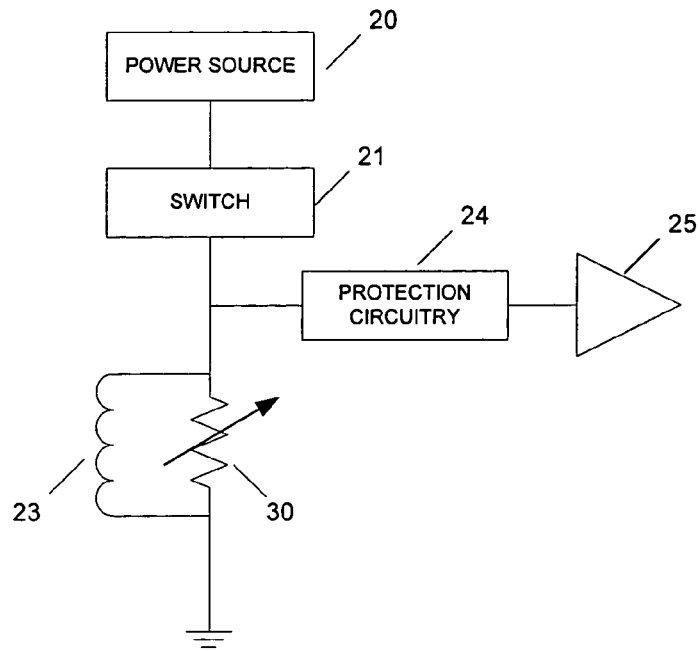
FIGS. 3a–b are block diagrams of the present invention that utilize a variable resistor across the transmitter and receiver coils.

FIG. 3a is almost identical to FIG. 2a except that a variable resistor 30 has replaced the damping resistor (22 in FIG. 2a). The variable resistor 30 is adjustable over the coil 23 such that during transmitter operation the kick-back voltage can be controlled and during receiver coil operation the bandwidth of the coil can be controlled.

Raising the resistance during transmitter coil operation will increase the kick-back voltage while reducing the resistance will decrease the kick-back voltage. When the coil is operating in receiver mode, raising the resistance will increase the coil bandwidth while lowering the resistance will decrease the coil bandwidth. Changing the bandwidth of the transmitter or receiver coil to match the bandwidth of a metal target increases the sensitivity of the PIMD. Increased sensitivity will optimize the metal detector for metal classification via time decay analysis. A first estimate of a metal object's time decay using a typical general purpose damping resistance value can be used to select the proper damping resistor values for an improved metal detection process. If the first time decay estimate measures a target with a long time decay then the computer can select a low damping resistor value from a look-up table (developed from previous measurements) so that the time decay of the transmitter and receiver will be more closely matched to the target's time decay. A lower damping resistor also reduces the bandwidth of the sensor and thus lowers the noise collected by the receiver coil. Conversely, if the first time decay estimate indicates a fast metal target time decay, the compute can select a large damping resistor value from a look-up table (developed from previous measurements) for the transmitter and receiver.

For metal detectors that use switches/relays to select different numbers of coil turns for either the transmitter or receiver, the computer controlled variable resistor method removes the need to have switches or relays select different value resistors for each coil configuration.

Figure 3B:
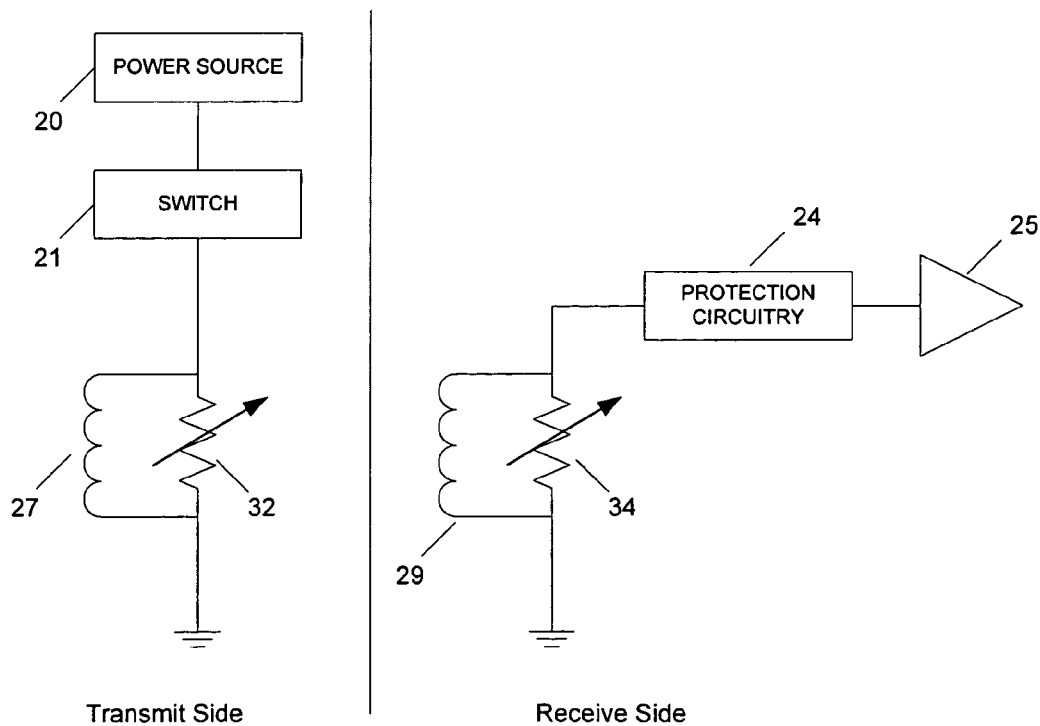

FIG. 3b is the same as FIG. 2b except that both damping resistors 26, 28 have been replaced by variable resistors 32, 34. Variable resistor 32 is across the transmitter coil 27 while variable resistor 34 is across the receiver coil 29. Each variable resistor can be separately controlled to optimize the metal detector's sensitivity as earlier described.

Figure 4A:
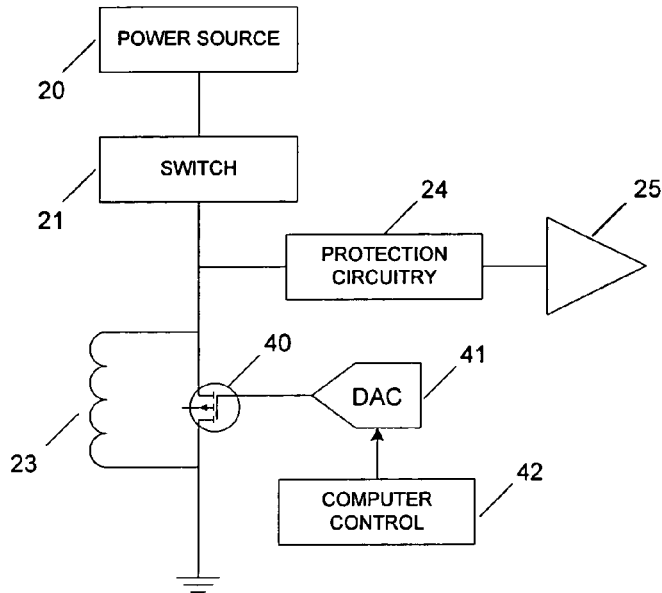
FIGS. 4a–b are block diagrams of the present invention that utilize a MOSFET configuration as a variable resistor across the transmitter and receiver coils.

FIG. 4a is identical to FIG. 3a except that the variable resistor 30 has been replaced with a specific implementation of a variable resistor, namely a FET (e.g., MOSFET) transistor 40 coupled with a digital-to-analog converter (DAC) 41 under the control of a computer 42. The DAC 41 control the gate voltage of MOSFET 40 that in turn controls the resistance of the source-drain path of MOSFET 40. This implementation acts as a fast variable resistor. The DAC 41 parameters can be controlled by the computer 42 to ultimately control the resistance.

The fast resistance response of the MOSFET allows the invention to dynamically adjust the damping resistor during the coil current change. For fastest decay time operation of the coil, the damping resistor can be continually changed to minimize the decay time of the coil without the coil going into oscillation. Feedback techniques known in the art can monitor the coil for oscillation and adjust the resistance so that the coil never goes into oscillation.

Figure 4B:
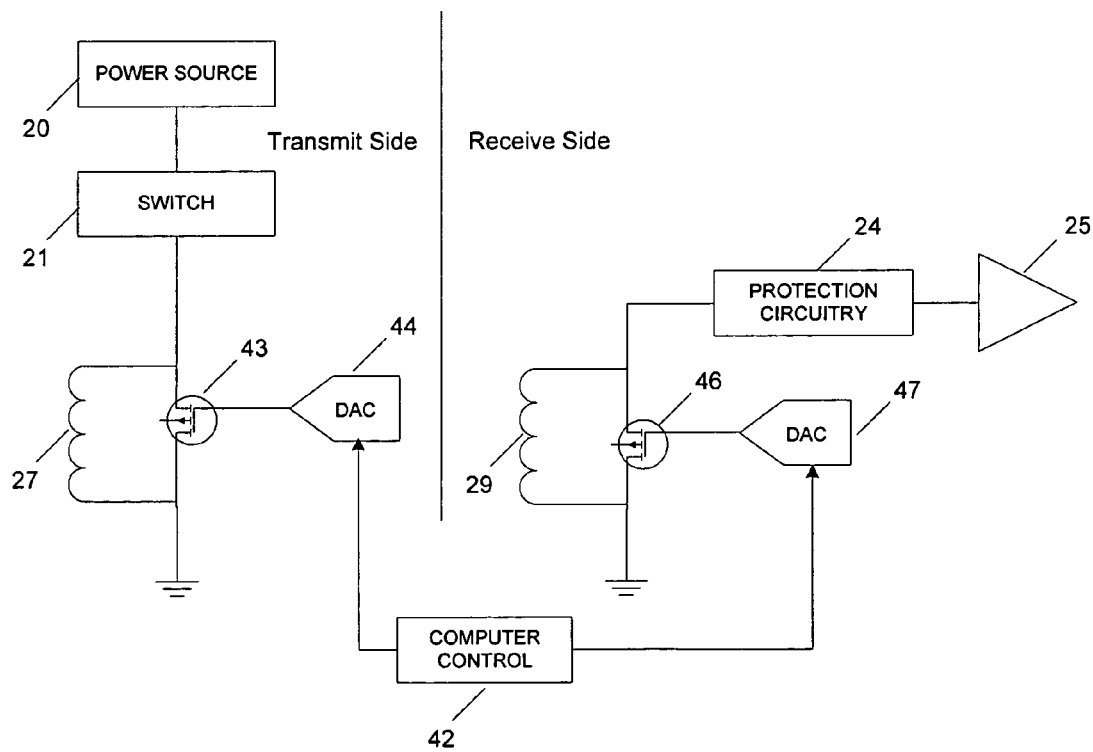

FIG. 4b merely separates the transmitter coil 27 and receiver coil 29 as was done in FIGS. 2b and 3b. This time separate MOSFETs 43, 46 coupled with DACs 44, 47 respectively are controlled by a computer 42. The computer can be programmed to separately vary the resistance between the source and drain of MOSFETs 43, 46.

It is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

The invention claimed is:

1. A pulse inductive metal detector comprising:
   an electronic switch for switching a power source on and off;
   a coil coupled with the electronic switch that can be charged with current from the power source in a transmitter mode such that when the electronic switch is abruptly switched open the coil emits a magnetic field that induces eddy currents in a metal target, and once the transmitter magnetic field has decayed enough, the electronic switch can be closed and the coil can be operated in a receiver mode to detect a magnetic field resulting from eddy currents in the metal target; and
   a variable resistor coupled across the coil for varying the resistance across the coil to optimize the pulse inductive metal detector sensitivity to the metal target, wherein the variable resistor comprises:
      a FET transistor having a source-drain path coupled across the coil, and a gate;
      a digital-to-analog converter (DAC) having an output coupled with the gate of the FET; and
      a computer, coupled to an input of the DAC, for controlling the DAC, wherein the computer sends a control signal to the DAC to control a gate voltage of the FET and thereby control the resistance of the source-drain path of the FET.

2. A pulse inductive metal detector comprising:
   an electronic switch for switching a power source on and off;
   a transmitter coil coupled with the electronic switch that can be charged with current from the power source such that when the electronic switch is abruptly switched open the coil emits a magnetic field that includes eddy currents in a metal target;
   a transmitter coil variable resistor coupled across the transmitter coil for varying the resistance across the transmitter coil to reduce a kick-back voltage induced in the transmitter coil, wherein the transmitter coil variable resistor comprises:
      a FET transistor having a source-drain path connected across the transmitter coil, and a gate;
      a digital-to-analog converter (DAC) having an output coupled to the gate of the FET; and
      a computer, coupled to an input of the DAC, for controlling the DAC wherein the computer sends a control signal to the DAC to control a gate voltage of the FET so as to control the resistance of the FET source-drain path;
   a receiver coil for detecting a magnetic field resulting from eddy currents in the metal target once the transmitter magnetic field has decayed; and
   a receiver coil variable resistor coupled across the receiver coil for varying the resistance across the receiver coil to optimize the pulse inductive metal detector sensitivity to the metal target.

3. A pulse inductive metal detector comprising:
   an electronic switch for switching a power source on and off;
   a transmitter coil coupled with the electronic switch that can be charged with current from the power source such that when the electronic switch is abruptly switched open the coil emits a magnetic field that induces eddy currents in a metal target;
   a transmitter coil variable resistor coupled across the transmitter coil for varying the resistance across the transmitter coil to reduce a kick-back voltage induced in the transmitter coil;
   a receiver coil for detecting a magnetic field resulting from eddy currents in the metal target once the transmitter magnetic field has decayed; and
   a receiver coil variable resistor coupled across the receiver coil for varying the resistance across the receiver coil to optimize the pulse inductive metal detector sensitivity to the metal target, wherein the receiver coil variable resistor comprises:
      a FET transistor having a source-drain path connected across the receiver coil, and a gate;
      a digital-to-analog converter (DAC) having an output coupled to the gate of the FET; and
      a computer, coupled to an input of the DAC, for controlling the DAC, wherein the computer sends a control signal to the DAC causing the gate voltage of the FET to vary thereby controlling the source-drain path resistance of the FET.

4. A variable damping induction coil for a pulse inductive metal detector comprising:
   a coil that can be charged with current from the power source in a transmitter mode such that when the current abruptly stopped, the coil emits a transmitter magnetic field that induces eddy currents in a metal target, and once the transmitter magnetic field has decayed enough, the coil can be operated in a receiver mode to detect a magnetic field resulting from eddy currents in the metal target; and
   a variable resistor coupled across the coil for varying the resistance across the coil to optimize the pulse inductive metal detector sensitivity to the metal target, wherein the variable resistor comprises:
      a MOSFET transistor;
      a digital-to-analog converter coupled with the MOSFET; and
      a computer for controlling the digital-to-analog converter wherein the computer sends a control signal to the digital-to-analog converter causing the gate voltage of the MOSFET to vary thereby controlling the resistance between the source and drain of the MOSFET.

5. A pulse inductive metal detector comprising:
   a coil configured to operate as a transmit coil and a receiver coil;
   a power source for providing a charging current to the coil;
   an electronic switch coupled with the power source and the coil and configured to
      (i) initially close to allow a flow of charging current to the coil, then
      (ii) open abruptly to interrupt the flow of charging current to the coil, thus causing the coil to emit a magnetic field that induces eddy currents in a metal target, then
      (iii) close again after the magnetic field has decayed sufficiently so that the coil is configured to detect a magnetic field resulting from the eddy currents in the metal target; and
   a variable resistor coupled across the coil for varying the resistance across the coil so as to either
      reduce a kick-back voltage produced by the coil when it emits the magnetic field, or
      optimize the signal receive bandwidth of the coil when it is configured to detect the magnetic field resulting from the eddy currents in the metal target, wherein the variable resistor comprises:
a FET transistor having a source-drain path coupled across the coil, and a gate;
a digital-to-analog converter (DAC) having an output coupled with the gate of the FET; and
a computer, coupled to an input of the DAC, for controlling the DAC, wherein the computer sends a control signal to the DAC to control a gate voltage of the FET and thereby control the resistance of the source-drawn path of the FET.

* * * * *

UNITED STATES PATENT AND TRADEMARK OFFICE
CERTIFICATE OF CORRECTION

| | | |
|---|---|---|
| PATENT NO. | : 7,075,304 B2 | Page 1 of 1 |
| APPLICATION NO. | : 10/942150 | |
| DATED | : July 11, 2006 | |
| INVENTOR(S) | : Carl V. Nelson | |

It is certified that error appears in the above-identified patent and that said Letters Patent is hereby corrected as shown below:

Col. 5, Claim 2, Line 7, delete "includes" and substitute therefor -- induces --.

Signed and Sealed this

Twenty-first Day of November, 2006

JON W. DUDAS
*Director of the United States Patent and Trademark Office*